US012781697B2

(12) United States Patent
de Ojeda et al.

(10) Patent No.: US 12,781,697 B2
(45) Date of Patent: Nov. 3, 2026

(54) HIGH PRESSURE FUEL PUMP WITH CONFIGURATION TO MITIGATE CAVITATION

(71) Applicants: William de Ojeda, Darien, IL (US); Haibao Wu, Oakbrook Terrace, IL (US)

(72) Inventors: William de Ojeda, Darien, IL (US); Haibao Wu, Oakbrook Terrace, IL (US)

(73) Assignee: WM International Engineering L.L.C., Darien, IL (US)

(*) Notice: Subject to any disclaimer, the term of this patent is extended or adjusted under 35 U.S.C. 154(b) by 0 days.

(21) Appl. No.: 19/014,685

(22) Filed: Jan. 9, 2025

(65) Prior Publication Data

US 2026/0194033 A1 Jul. 9, 2026

(51) Int. Cl.

| | |
|---|---|
| ***F02M 37/00*** | (2006.01) |
| ***F02M 31/20*** | (2006.01) |
| ***F02M 37/04*** | (2006.01) |
| ***F02M 59/46*** | (2006.01) |
| ***F04B 11/00*** | (2006.01) |
| ***F04B 23/02*** | (2006.01) |
| ***F04B 49/10*** | (2006.01) |
| *F04B 13/00* | (2006.01) |

(52) U.S. Cl.

CPC ........ *F02M 37/0052* (2013.01); *F02M 31/20* (2013.01); *F02M 37/0029* (2013.01); *F02M 37/043* (2013.01); *F02M 59/46* (2013.01); *F04B 11/00* (2013.01); *F04B 23/021* (2013.01); *F02M 37/0041* (2013.01); *F04B 13/00* (2013.01); *F04B 49/10* (2013.01)

(58) Field of Classification Search

CPC ........... F02M 37/0052; F02M 37/0041; F02M 37/043; F02M 59/46; F02M 31/20; F02M 37/0029; F04B 11/00; F04B 13/00; F04B 23/021; F04B 49/10

See application file for complete search history.

(56) References Cited

U.S. PATENT DOCUMENTS

| | | | | |
|---|---|---|---|---|
| 7,793,642 | B2 * | 9/2010 | Yonemoto .......... | F02M 37/0052 123/514 |
| 10,190,553 | B2 * | 1/2019 | Ficarella ................ | F02M 37/06 |
| 2008/0156295 | A1 * | 7/2008 | Suzuki ................... | F02M 37/32 123/456 |
| 2016/0169147 | A1 * | 6/2016 | Surnilla ............. | F02D 41/2461 123/299 |

* cited by examiner

*Primary Examiner* — Charles G Freay

(57) ABSTRACT

A passage is placed in a high-pressure pump used with liquified gases such as Dimethyl Ether and propane to divert part of the inlet flow to allow for a constant cooling around the piston pumping unit. The passage is placed ahead of the pump inlet metering valve to avoid fluid from stagnating and socking the heat from the pump. The cooling passage is directed to the tank via a low pressure regulator that is used to control the pressure in the low-pressure feed line to the pump. The cooling allows the high-pressure pump to operate at higher pressures while managing the heat and limiting the temperatures developed by the pumping work, which otherwise would result in flashing of the fluid and cavitation, the loss of volumetric efficiency, and compromised operation due to excessive wear of the pump components exposed to the cavitation.

3 Claims, 3 Drawing Sheets

HIGH PRESSURE FUEL PUMP WITH CONFIGURATION TO MITIGATE CAVITATION

STATEMENT OF FEDERALLY SPONSORED RESEARCH

This invention was made with government support under contract DE-EE0009878 awarded by the U.S. Department of Energy. The government has certain rights in the invention.

CROSS-REFERENCE TO RELATED APPLICATION application Ser. No. 18/741,030

NAMES OF THE PARTIES TO A JOINT RESEARCH AGREEMENT

Not applicable

BACKGROUND OF THE INVENTION

Pressurization of a fluid raises the fluid temperature and the temperature of the pump components. In the case of pressurization of liquified gases such as Dimethyl Ether, propane, and similar fluids, heat from the pumping work will elevate the temperatures of the incoming fluid into the pump and risk flashing, with significant deterioration to the pumping efficiency. As the incoming fluid comes in contact with the hot environment, the fluid can transition from liquid to the vapor phase, thus cavitating.

If the fluid were to cavitate at the pump inlet, the pump's volumetric efficiency would drop dramatically generating severe ping-like noises and pump components would be subject to erosion over time, compromising the pump's function. Heating of the pump and the fluid in the pump limits the pump's pressure capability due to the onset of cavitation.

Several options exist to mitigate cavitation. One option is to increase the inlet pressure to shift the vapor pressure-temperature point to a higher value. A second option is to provide active cooling at the pump. The first option is inadequate because it places an excessive requirement on the feed pump used to prime the high-pressure pump. Pressures would need to increase considerably to avoid cavitation. Yet, higher pressures would further elevate the fluid temperatures. Real-life practice indicates that higher inlet pressures are not an effective way to reduce cavitation. The second option, applying active cooling, poses significant design challenges. One challenge is to place cooling passages near where the pump pressurizes the flow, near the plunger-barrel interface, corresponding to the most stressed parts of the pump. Furthermore, convection cooling is not effective in reducing temperatures near the plunger element of the pump.

Our invention provides a method to manage the inlet fluid temperature by (i) using excess inlet flow to cool the pump, and (ii) coordinating the excess flow with the inlet flow control valve open and close schedules. This invention does not require an increase in inlet pressure nor the design of complicated cooling passages in the pump. The invention can increase the pump pressure output with liquified gases.

SUMMARY OF THE INVENTION

Our invention discloses a cooling methodology for a high-pressure fuel pump used with liquified gases, such as Dimethyl Ether and propane. High-pressure fuel pumps used with liquified gases are known to cavitate as the pressure output is increased, owing to the heat generated and the effect it has in raising the temperature of the inlet flow into the pump. As the pump temperature rises, the inlet flow temperature also rises over the saturation vapor pressure-temperature line, causing the fluid to vaporize. A high-temperature spot within the pump is sufficient to cause local cavitation, resulting in a rapid and severe deterioration of the pump's performance. Furthermore, any cavitation will compromise the pump's integrity, owing to premature wear of components.

In a typical common rail fuel injection system, such as in the invention disclosure U.S. Pat. No. 6,357,421B1, the high-pressure fuel pump is fed at a fixed pressure, at a level that ensures sufficient flow for optimum refill of the pump plungers, while not compromising the pump internal seals. Excess pressure is for this reason not desirable. For traditional fuels such as diesel, high temperatures developed at the pump during pressurization do not affect significantly the density of the inlet flow. The high-pressure pump pressurizes the fluid at pressures for the injector to meter the fluid in the combustion chambers the engine. The pressure is regulated at the common rail, by spilling excess flow to the tank. In this embodiment, the pump operates at full displacement and generates heat that is proportional to the amount of flow being pressurized.

The common rail design evolved to place metering valves in the high-pressure pump to limit the flow and limit the work needed to drive the pump, with the result of better engine efficiencies and lower temperatures. The inlet metering could take place at each of the pump's piston units, such as in the patent disclosure U.S. Pat. No. 7,350,505B2, or at the pump overall inlet, with one valve metering the flow to multiple pump pistons, such as in the patent disclosure 2009/0299606 A1. These later designs continue to utilize a pressure regulator in the rail for improved pressure regulation, and management of fuel temperature in the rail by providing a spill flow at the rail.

Examination of the high-pressure pump function shows that while the pump piston moves to pressurize the fluid, the inlet flow comes to a stop at the pump piston inlet. The flow remains static during the piston motion of pressurization, before the fill port opens to refill the piston as it retracts to the base circle of the pump crank. The static flow is exposed to the hot pump body surrounding the piston-barrel. This high temperature can bring the inlet flow to flash, whereupon the pump efficiency is compromised.

In prior art of high-pressure fuel pump designs, elevated pump temperatures result near the plunger pumping element, high enough, that when pumping liquified gases temperatures will result in cavitation of the fluid at the inlet. In prior art, when the pump pressurizes the fluid, the inlet flow comes to a stop at the pump plunger inlet. The flow remains static during pressurization. The static flow is exposed to the high temperatures surrounding the plunger-barrel. This high temperature can bring the inlet flow to flash, whereupon the pump efficiency is compromised.

Our invention provides steps to manage the pump temperature and operate below the cavitation threshold at higher operating pressures. It provides a passage with a check valve from the inlet metering valve feeding the pump plunger cavity to the pump return to the tank. The check valve is open and allows a cooling flow to the barrel when the inlet metering valve is closed and the plunger is pumping. On the other hand, the check valve is closed when the inlet metering valve is open and the plunger is retraction to refill, thus providing fresh flow into the plunger volume.

BRIEF DESCRIPTION OF THE DRAWINGS

An exemplary embodiment of the invention is represented in the drawings and is explained in more detail in the following description.

DETAILED DESCRIPTION

Figure 1:
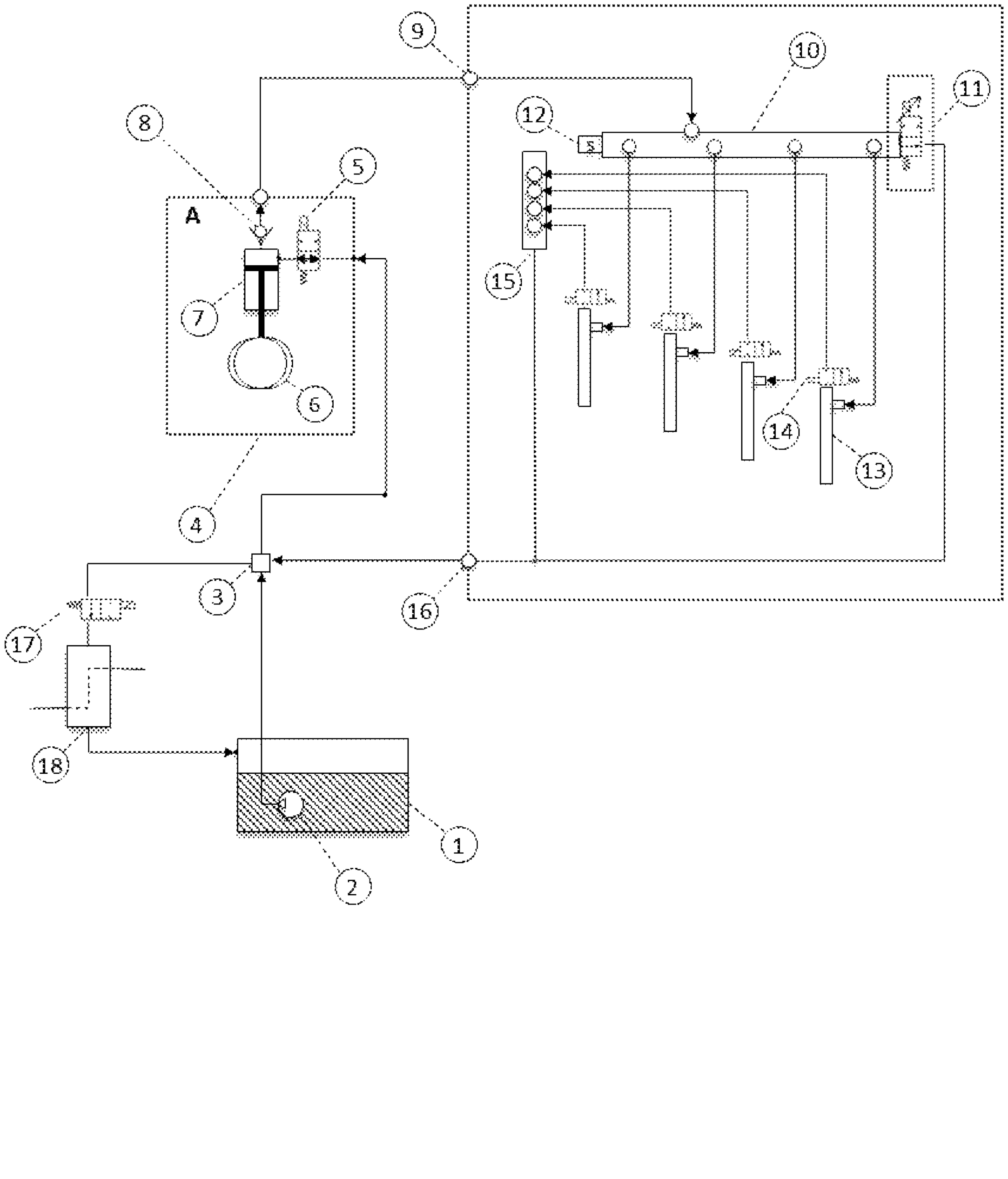
FIG. 1 shows the configuration of a common rail system, with notable placement of the high-pressure fuel pump and how the flow is introduced therein in the present state of art.

FIG. 1 shows an outline of a common rail fuel injection system used in an engine. The illustration is used to highlight the invention later shown in FIG. 2. The system is comprised of a tank (1) to store fuel, and in the case of a liquified gas, the tank stores fuel in the liquid state at the bottom and gas on the top at the vapor saturation pressure. A fuel delivery pump (2), stored in or out of the tank, shown here inside the tank, pressurizes the fuel, and delivers it through a junction port (3) to a high-pressure fuel pump (4). For a liquified gas system, it is critical that the feed to the high-pressure pump remain always in the liquid state. A low-pressure regulating valve (17) is used to control the feed pressure.

The high-pressure pump (4) is comprised of an inlet metering valve (5), a crank (6), shown here with two lobes to displace a piston (7) per each revolution, and an output check valve (8). The pump may have one or more plungers. The inlet metering valve (5) is electronically controlled to fill the piston (7). Timing allows fuel to return to the inlet before it closes to match the fuel demand by the injectors. The high-pressure output flow is directed via port (9) to the fuel rail (10). The rail (10) houses a fuel pressure regulator (11) and a fuel pressure sensor (12). The rail (10) provides a stable pressure and flow to the injectors (13), which vary in number according to the engine configuration. The injector (13) meters flow into the engine cylinder via its electronic metering valve (14), which upon actuation spills flow through the injector return manifold (15). Flow from the return manifold (15) and from the pressure regulator (11) spill, is directed through port (16) to the junction (3). The return flow is directed through the pressure regulating valve (17), through a heat exchanger (18) to the tank (1). The heat exchanger (18) dissipates heat built up by pumping and from the engine combustion through the block to the rail. In this embodiment the flow into the pump is fully exposed to the heat absorbed by the pump due to the pumping work.

Figure 2:
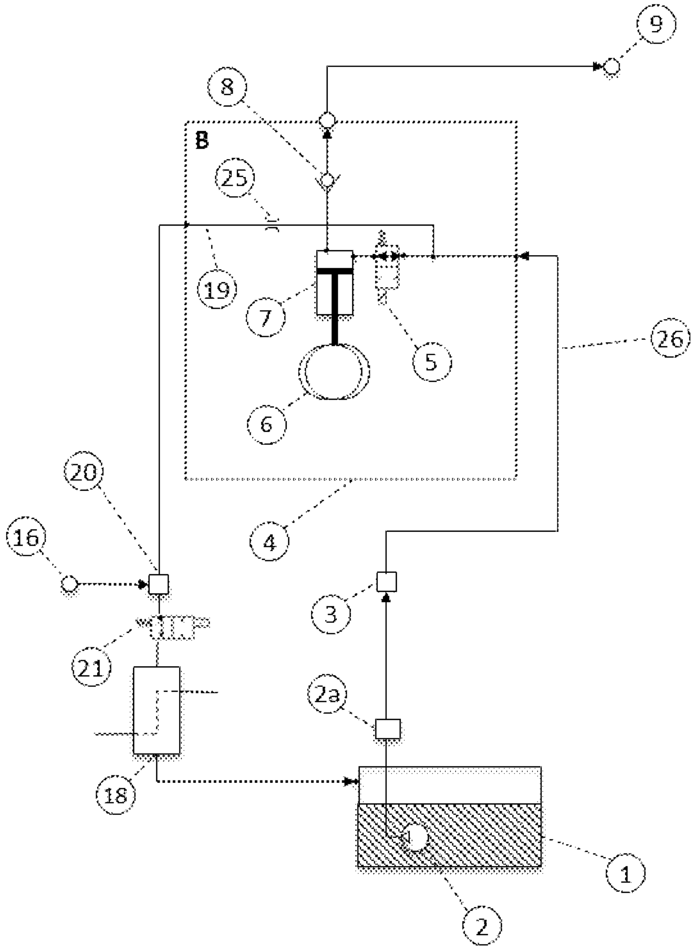
FIG. 2 shows a modification of the current embodiment of the common rail system showing the cooling port and the placement of the low-pressure regulator.

FIG. 2 shows a variation of the embodiment found in FIG. 1 and describes the invention. Here the flow from the low-pressure pump (2) is directed through junction (3), through supply passage (26), into the high-pressure pump (4). Flow is favored to feed directly through the inlet metering valve (5) into the pumping piston (7). A portion of the inlet flow flows through a passage (19), through a throttle (25), out of the housing. From passage (19) flow is directed through the junction (20), to the low-pressure regulator (21), into the heat exchanger (18), and back to the tank (1). Return from the fuel rail pressure relief valve (11) and the injector spill valves (14), is routed through port (16) into the junction (20). In the embodiment of FIG. 2, the low-pressure is regulated after the pump via the relief valve (21), allowing the excess fluid to serve as a cooling flow for the high-pressure pump, targeting the cooling near the inlet metering valve (5).

Figure 3:
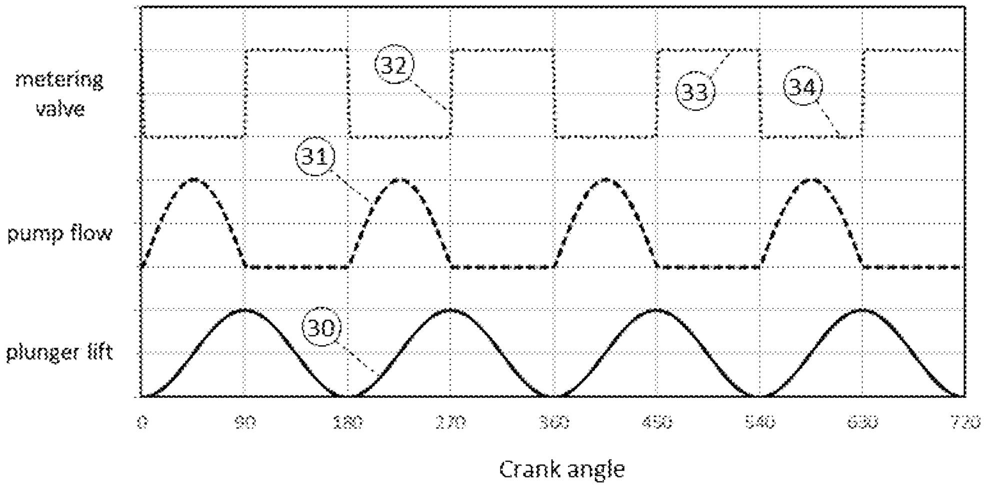
FIG. 3 shows a rendering of the piston motion, flow into the high-pressure rail, and the operation schedule of the inlet metering valve.

FIG. 3 shows a representation of the pumping piston (7) motion (30) driven by the pump crank (6). The pump flow (31) is illustrated corresponding to the inlet metering valve schedule (32). Schedule (32) corresponds to the pump full displacement. The figure indicates region (33) where the inlet metering valve is open corresponding to the filling of the piston as the piston is retracted back to the base circle of the crank (6). The figure indicates region (34) where the inlet metering valve is closed as the piston pumps fluid into the rail. During segment (34) the fuel comes to a stop just ahead of the metering valve (5). During this segment (34) the inlet fuel in the embodiment of FIG. 1 is stationary and it is heated by the pump housing and pump components. In the embodiment of FIG. 2 the inlet fluid flows through the pump passage (19) and returns to the tank via the regulator (20) and heat exchanger (18). This through flow during segment (34) serves to cool the pump inlet hardware just ahead of the inlet port to the piston.

What is claimed is:

1. A high pressure fluid system for liquified gases comprising:

- a tank storing a liquified gas and a gas at a vapor saturation pressure therein;
- a low pressure pump providing an excess flow of the liquified gas from the tank at a supply pressure to a high pressure pump through a supply passage;
- the high pressure pump including a plunger reciprocating in a cylinder and an outlet check valve delivering the liquified gas at high pressure to a high pressure circuit;
- an inlet metering valve receiving the liquified gas at the supply pressure provided by the supply passage and directly providing a portion of the liquified gas at the supply pressure to the cylinder;
- a spill passage connected upstream of the inlet metering valve to the supply passage and providing a remaining portion of the excess flow of liquified gas to a return port of the tank;
- a throttle valve in the spill passage, the remaining portion of the excess flow of liquified gas flowing from the throttle valve to a junction connected to a return flow of the high pressure circuit to create a combined flow of liquified gas;
- a low pressure regulator located in the spill passage after the junction, the low pressure regulator being configured to adjust the remaining portion of the excess flow to consistently flow through the spill passage in order to provide cooling to the high pressure pump; and,
- a heat exchanger configured to cool the combined flow of liquified gas and remove heat accumulated in the combined flow of liquified gas.

2. The high pressure pump of claim 1, wherein the pressure upstream of the inlet metering valve and the pressure in the spill passage is the same as the supply pressure when the inlet metering valve is closed.

3. The high pressure pump of claim 1, wherein the flow through the low pressure regulator takes place when the inlet metering valve is closed; and, wherein the flow through the low pressure regulator is suppressed when the inlet metering valve is open, and the plunger is refilling.

* * * * *